(No Model.)
H. D. BUTCHER & J. M. JOHN.
GATE.
No. 557,550. Patented Apr. 7, 1896.
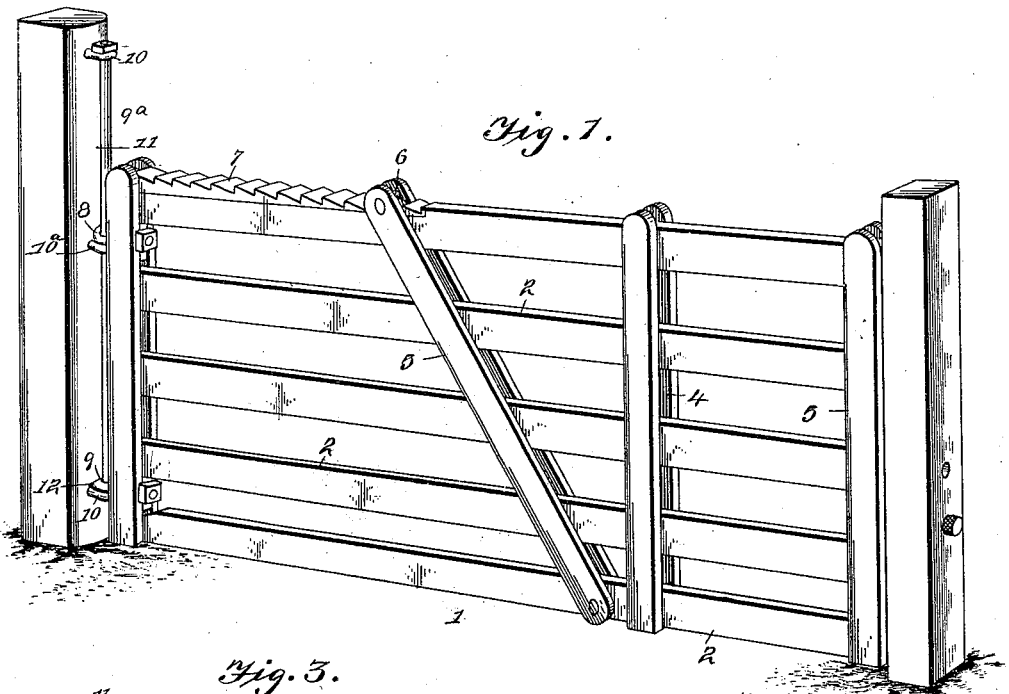
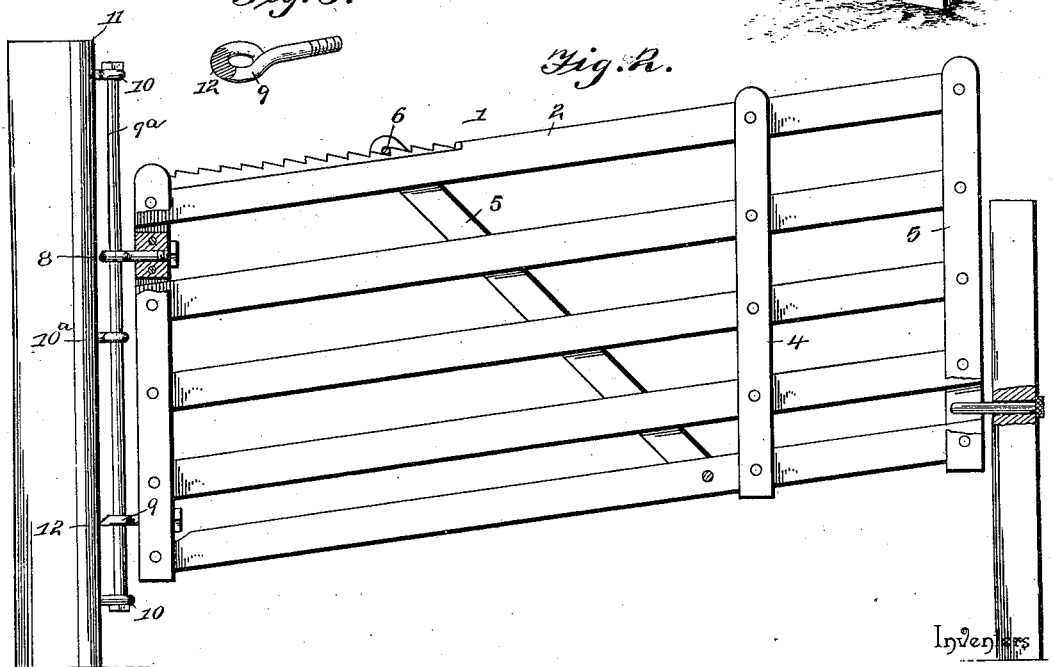
Witnesses
Thos. W. Riley
J. H. Riley
Inventors
Hugh D. Butcher,
and
James M. John.
By their Attorneys,
C. A. Snow & Co.

UNITED STATES PATENT OFFICE.

HUGH D. BUTCHER AND JAMES M. JOHN, OF WESTON, WEST VIRGINIA.

GATE.

SPECIFICATION forming part of Letters Patent No. 557,550, dated April 7, 1896.

Application filed January 16, 1896. Serial No. 575,729. (No model.)

*To all whom it may concern:*

Be it known that we, HUGH D. BUTCHER and JAMES M. JOHN, citizens of the United States, residing at Weston, in the county of Lewis and State of West Virginia, have invented a new and useful Gate, of which the following is a specification.

The invention relates to improvements in gates.

The object of the present invention is to improve the construction of swinging gates, and to provide a simple and inexpensive one adapted to be adjusted vertically on the hinge-post, and capable of swinging upward to counteract sagging, to enable it to swing clear of obstructions and to provide a passage for small animals and the like.

The invention consists in the construction and novel combination and arrangement of parts hereinafter fully described, illustrated in the accompanying drawings, and pointed out in the claim hereto appended.

In the drawings, Figure 1 is a perspective view of a gate constructed in accordance with this invention. Fig. 2 is a side elevation, partly in section. Fig. 3 is a detail perspective view of the lower eye of the gate.

Like numerals of reference designate corresponding parts in all the figures of the drawings.

1 designates a gate composed of horizontal rails 2 and vertical bars 3, 4, and 5, arranged in pairs and disposed at the ends of the rails and at an intermediate point. The vertical bars are pivotally connected to the longitudinal rails of the gate and the latter is adapted to be raised or swung upward on the pivots of the end bars at its inner end, as illustrated in Fig. 2 of the accompanying drawings. This adjustment is adapted to counteract sagging, to enable the gate to swing clear of obstructions, such as snow and the like, and also to provide a passage for small animals and the like.

The gate is secured in its pivotal adjustment by means of an inclined brace 5, composed of two bars located at opposite sides of the gate, pivoted at their lower ends to the bottom rail of the gate and disposed at an inclination. The upper terminals of the bars of the brace 5 are connected by a transverse pin 6 or other suitable fastening device, which is arranged to engage a longitudinally-disposed rack-bar 7, detachably secured to the upper edge of the top rail of the gate and located at the inner portion thereof. This rack-bar strengthens the gate and is provided with a series of notches, any one of which is adapted to receive the pin 6 of the brace.

Upper and lower eyes 8 and 9 are arranged at the inner end of the gate and receive a vertical pintle-rod 9ª, which is supported at its terminals by upper and lower eyes 10 of a hinge-post 11. The terminals of the pintle-rod are threaded and receive nuts which retain the ends of the rod in the eyes 10, and an intermediate eye 10ª is also employed for supporting the pintle-rod.

The upper and lower eyes of the gate are provided with threaded shanks and receive nuts by means of which they are secured to the gate. The lower eye 9 of the gate has an enlarged opening for the reception of the pintle-rod to permit a limited movement of the gate to enable a rearwardly-disposed spur 12 to be engaged with and disengaged from the hinge-post. The spur is preferably formed by beveling the rear portion of the lower eye at its upper face, and it is adapted to be embedded in the face of the hinge-post to retain the gate at any desired vertical adjustment of the pintle-rod. The gate is capable of vertical adjustment bodily on the pintle-rod, the latter being extended a sufficient distance above the gate to permit such adjustment. When the gate is elevated, as illustrated in Fig. 2 of the accompanying drawings, its weight holds the spur firmly in engagement with the hinge-post.

It will be seen that the gate is simple, strong, and durable, that it is capable of vertical pivotal adjustment on the pivots of the inner end bars, and that it is also capable of vertical adjustment bodily on the pintle-rod. It will also be apparent that the spur of the lower eye is capable of holding the gate firmly at any vertical adjustment on the pintle-rod.

Changes in the form, proportion, and minor details of construction may be resorted to without departing from the principle or sacrificing any of the advantages of the invention.

What we claim is—

The combination with a gate-post, of longitudinal rails and bars pivotally connected to the rails, a rack arranged at the top of the gate, and a brace pivoted at its lower end to the bottom of the gate and engaging at its upper end the rack-bar, a hinge-post, a vertical pintle-rod mounted on the hinge-post, and upper and lower eyes mounted on the gate and receiving the pintle-rod, the lower eye being provided with a rearwardly-disposed spur arranged to engage the hinge-post to secure the gate in its vertical adjustment on the pintle-rod, substantially as described.

In testimony that we claim the foregoing as our own we have hereto affixed our signatures in the presence of two witnesses.

HUGH D. BUTCHER.
JAMES M. JOHN.

Witnesses:
GEO. V. FINSTER,
MARION LOSH.